Dec. 21, 1965     T. F. ZLOTEK     3,224,542
FORCE LUBRICATED SPRAG CLUTCH
Filed March 11, 1963     2 Sheets-Sheet 1
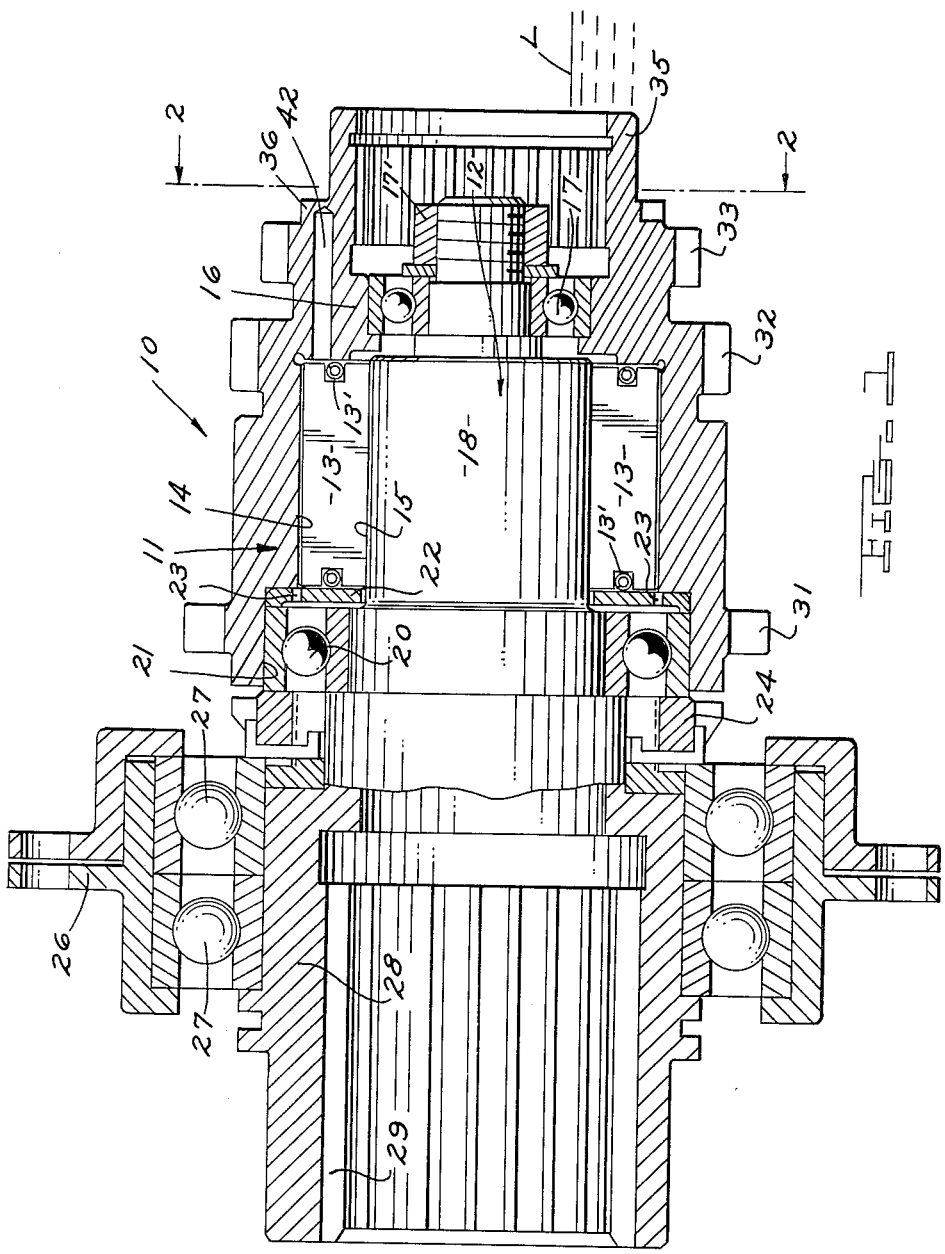
INVENTOR.
THADDEUS F. ZLOTEK
ATTORNEYS Dec. 21, 1965  T. F. ZLOTEK  3,224,542
FORCE LUBRICATED SPRAG CLUTCH
Filed March 11, 1963  2 Sheets-Sheet 2
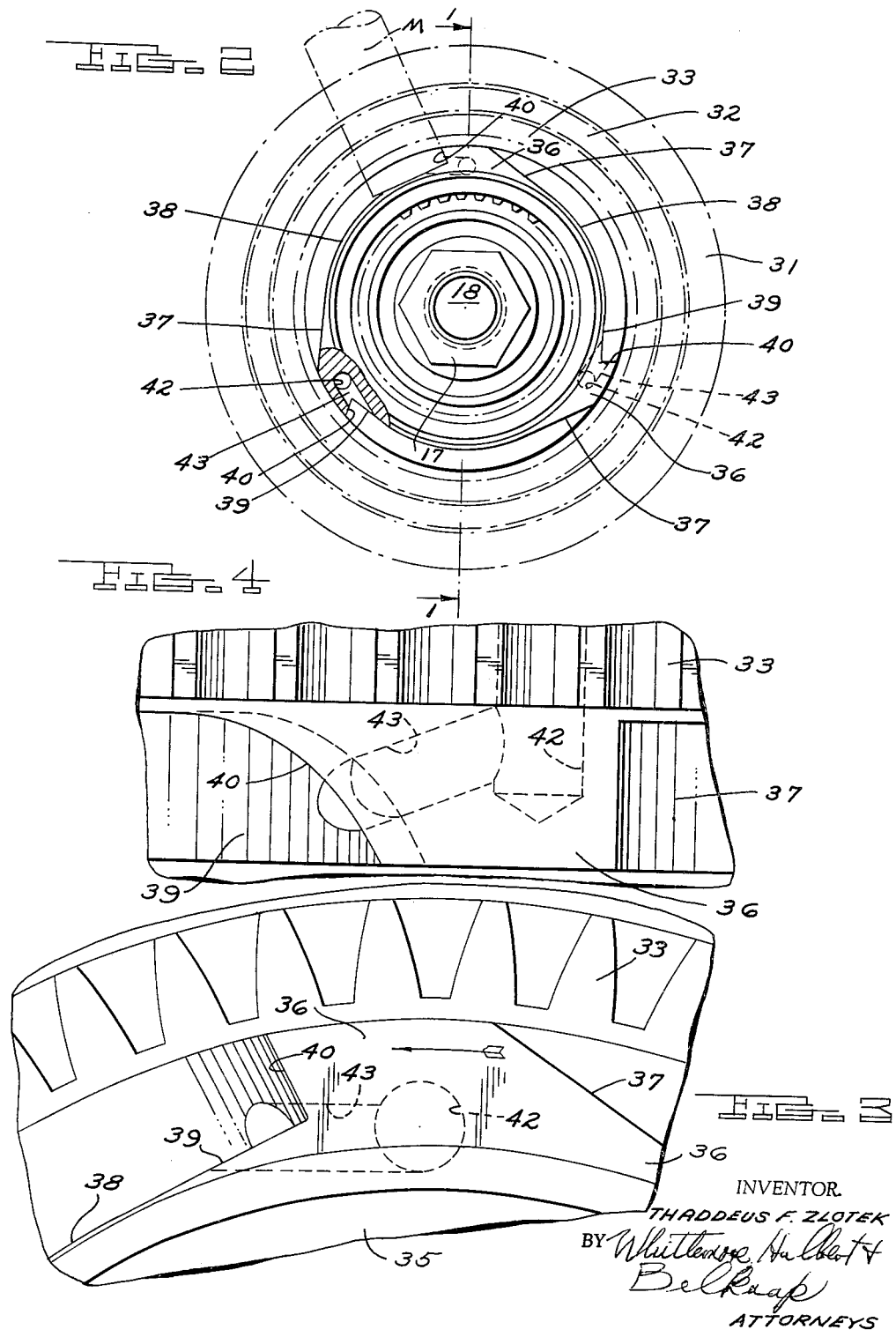
INVENTOR.
THADDEUS F. ZLOTEK
BY
ATTORNEYS United States Patent Office 3,224,542
Patented Dec. 21, 1965

3,224,542
FORCE LUBRICATED SPRAG CLUTCH
Thaddeus F. Zlotek, Detroit, Mich., assignor to Formsprag Company, Warren, Mich., a corporation of Michigan
Filed Mar. 11, 1963, Ser. No. 264,297
9 Claims. (Cl. 192—113)

The present invention relates to improvements in a sprag-type mechanical clutch and, more particularly, to improved provisions for the force feed lubrication of such a clutch in order to insure an efficient overrunning and re-engaging action typical of a sprag clutch, and to maintain the sprag and race components of the clutch flushed at all times to prevent accumulation of foreign or possibly abrasive matter.

While the invention is herein illustrated and described in a typical application for the drive of the electrical alternator of an aircraft, coupled with the drive of certain accessory power take-off gears, it is to be understood that the principle and basic structural features of the invention are applicable in a general way to sprag or equivalent clutches whose uses indicate force lubrication to be desirable.

It is an object of the invention to provide a force lubricated sprag clutch characterized by provisions of an exceedingly simple nature, not requiring extensive cost in parts fabrication or installation, by which efficient lubrication for the above mentioned purposes is made possible.

More specifically, the invention contemplates a force-lubricated sprag clutch featuring built-in oil scoop structure integral with one of the sprag clutch races, preferably the outer race, for the desired purpose, thus eliminating the time and expense of assembling separate oil scoop parts to the race or other part.

A further object is to provide a force-lubricated sprag clutch as described in the preceding paragraph, in which the oil scoop means in question is devised to secure the most efficient flow of lubricating oil, assisted by centrifugal force, into the sprag receiving space between the clutch races, thence out of this space to an appropriate disposal place, such as a sump.

The foregoing as well as other objects will become more apparent as this description proceeds, especially when considered in connection with the accompanying drawings illustrating the invention, wherein:

FIG. 1 is a view in axial cross section, along line 1—1 of FIG. 2, through a force-lubricated clutch in accordance with the invention;

FIG. 2 is a view in transverse vertical section along line 2—2 of FIG. 1;

FIG. 3 is a fragmentary end elevational view showing features of FIG. 2 in larger scale; and FIG. 4 is a top plan view of a portion of the oil scoop structure of the improvement, also in larger scale.

As indicated above, although the lubricating features of the invention are shown as applied to a sprag clutch employed in the drive of an aircraft electrical alternator and typical power take-off gearing, the invention is in actuality directed to the clutch structure alone, and is applicable to various types of overrunning clutch similar to the well-known sprag type.

As shown in the drawings, the clutch is generally designated by the reference numeral 10 and comprises an outer rotating race 11, an inner rotating race 12 disposed coaxially and concentrically in radially spaced relation thereto, and a series of conventional sprags 13 disposed in the intervening annular space between the races for overrunning driving engagement between cylindrical race surfaces 14, 15 of the respective outer and inner race members. The sprags are urged for wedging engagement between race surfaces 14, 15 by a pair of coiled garter springs 13', in a known manner. In the description to follow, the outer race 11 will be assumed to be a driver and the inner race 12 a driven member, this being preferable by reason of both manufacturing and centrifugal force considerations. However, it is to be understood that the driver-driven relationship mentioned above may be reversed.

As shown in FIG. 1, the outer race 11 has an accurately finished counterbore providing the cylindrical race surface 14, and in part defined by an outer end portion 16 of smaller diameter which receives a ball bearing 17, in which a cylindrical barrel portion 18 of the inner shaft or race 12 is rotatively journaled. The bearing 17 is outwardly retained by suitable means, including a nut 17' threaded on the reduced outer end of race barrel 18. The barrel portion 18 furnishes the accurately machined inner race surface 15.

The driven race 12 is further journaled within outer race 11 by means of a ball bearing 20 received in an end counterbore 21 of race 11; and an annular sprag retainer disc or ring 22 is interposed between bearing 20 and the adjacent ends of the sprags 13. The retainer washer 22 is provided with a plurality of circumferentially spaced oil drain apertures 23 therethrough, for a purpose hereinafter referred to. A suitable restraining nut 24 threaded on the inner race 12 serves as a retainer for the bearing 20.

The entire sprag unit 10 is fixedly mounted on an appropriate support (not shown) by means of a rigid metal bearing housing 26, in which the outer races of a pair of radial and end thrust ball bearings 27 are received. These bearings rotatably journal an enlarged, integral axial sleeve extension 28 of the driven inner race 12; and such extension is internally splined at 29 to receive and drive a suitable shaft or like member appropriately connected either directly or indirectly to some unit to be driven. This has been stated to be the electrical alternator of an aircraft, in which hydraulic or other means (not shown) may intervene between the alternator and sleeve 29. However, as indicated above, the invention contemplates the drive of other types of component.

Outer race member 11 is machined to provide a plurality of axially spaced, integral spur gears 31, 32 and 33, for engagement by meshing power take-off gears in the drive of other accessories (not shown).

The foregoing structure is one typically suited for the instanced alternator drive, and in general constitutes no part of the present invention, save to the extent of the race members, the sprags, and the apertured retainer and lubricator discharge disc or ring 22, with which the special force-feed lubricating device, now to be described, coacts.

The reduced diameter bearing portion 16 of outer race 11 includes an integral sleeve formation 35 extending axially outwardly thereof and coaxial with the race surfaces 14, 15; and it is in this sleeve portion and the race portion or extension 16 of which it is a part that the oil scoop lubricating means of the invention is incorporated.

Thus, referring particularly to FIGS. 3 and 4 in conjunction with FIG. 1, sleeve 35 has its periphery externally milled (in three zones spaced equally from one another in the peripheral sense, as shown in FIG. 2) to leave an equal number of projections 36 which extend forwardly of the outer end faces of the power take-off gear 33. An end face mill M, such as is shown in dot-dash line in FIG. 2, is preferably employed for the purpose, and the result of the operation is a cut which extends from one projection 36 along a tangent 37 to and about the outer periphery of the cylindrical sleeve formation, thence concentrically of the latter at 38, thence on a departing tangent at 39 to the next projection 36 outlined by the cut. Each projection is thus provided with a circumferentially facing surface 40 paralleling the axis of the mill M and of concave outline in the direction of rotation.

At each of such projections 36 the outer race extension 16 is drilled parallel to its axis to provide an oil passage 42 which extends into the projection from the annular space receiving the sprags 13. Of course, although only three projections 36 are shown as provided with such drain passages, the number may be greater or less, as suits the requirements of the installation in regard to volume of lubricant required for its purpose. In a typical clutch having an outer race diameter of about 1.92 inch, the illustrated three passage structure was capable of delivering one pint of lubricant per minute at 6000 r.p.m.

In order to complete the oil scoop structure, each formation is drilled in an approximately tangential direction, but angling slightly inwardly of a true tangent, as well as slightly inwardly in the axial direction toward the sprag space (as shown in FIGS. 3 and 4), so as to provide a scoop intake passage 43 extending into communication with the axially extending passage 42. As angled to the extent indicated by the arrow in FIG. 3, there is developed a desired centrifugal force feed through passages 43, 42, and into the sprag-receiving space. The oil exits under pressure through the discharge apertures 23 of retainer disc 22, thence past bearing 20 for return to the reservoir or sump mentioned.

It is of course understood that in operation the race 11 runs with at least a portion thereof including its sleeve extension 16 and the circumferential line of the scoop formations 36, well immersed in oil in the sump (not shown), the oil level being suggested at L (FIG. 1). Thus, the angling of the scoop intake passage 43 (FIGS. 3 and 4) in both the axial and radial senses is such as best takes advantage of the centrifugal force in picking up the lubricant and "throwing" it into the passage 42. It will also be observed that this is done causing a minimum of turbulence in the oil as the formations 36 enter and leave the body of lubricant.

The invention provides an extremely simple and relatively inexpensive oil scoop type of force-feed lubrication means for sprag and related types of overrunning clutch. The cost of component individual parts for the purpose, and the assembly thereof, is eliminated. The structure is likewise exceedingly compact in the radial and axial senses. The race surfaces 41, 15 are well lubricated, and they and the sprags are at all times force-flushed to prevent the accumulation of foreign matter, metal particles and the like which might set up an abrasive action if not gotten rid of.

What I claim as my invention is:

1. A force lubricated rotary clutch mechanism including a pair of coaxial, radially spaced and relatively rotatable races, clutch elements acting in conjunction with said races in the annular space therebetween, and means to force lubricate said space, comprising an integral formation on a rotating one of said races which has a face exposed in the direction of rotation of said race, said formation being provided wtih a lubricant scoop passage therein opening from said face and extending in the formation generally tangentially of the rotative direction to said annular space, said passage being inclined in the axial direction toward said space.

2. A force lubricated rotary clutch mechanism including a pair of coaxial, radially spaced and relatively rotatable races, clutch elements acting in conjunction with said races in the annular space therebetween, and means to force lubricate said space, comprising an integral formation on a rotating one of said races which has a face exposed in the direction of rotation of said race, said formation being provided wtih a lubricant scoop passage therein opening from said face and extending in the formation generally tangentially of the rotative direction, said rotating race having a further, generally axial passage therein communicating with said first named passage and extending to said annular space, said first named passage being inclined in the axial direction toward said space.

3. A force lubricated rotary clutch mechanism including a pair of coaxial, radially spaced and relatively rotatable races, clutch elements acting in conjunction with said races in the annular space therebetween, and means to force lubricate said space, comprising an integral formation on a rotating one of said races which has a face exposed in the direction of rotation of said race, said formation being provided with a lubricant scoop passage therein opening from said face and extending in the formation generally tangentially of the rotative direction, said rotating race having a further, generally axial passage therein communicating with said first named passage and extending to said annular space, said first named passage being inclined in the axial direction toward said space, said passages being formed wholly within said rotating race.

4. A force lubricated rotary clutch mechanism including a pair of coaxial, radially spaced and relatively rotatable races, clutch elements acting in conjunction with said races in the annular space therebetween, and means to force lubricate said space, comprising an integral formation on a rotating one of said races which has a face exposed in the direction of rotation of said race, said formation being provided with a lubricant scoop passage therein opening from said face and extending in the formation generally tangentially of the rotative direction to said annular space, and an annular retainer for said clutch elements disposed at an axial end of the latter remote from said formation and apertured for the passage of lubricant supplied to said annular space by said force lubricating means.

5. A force lubricated rotary clutch mechanism including a pair of coaxial, radially spaced and relatively rotatable races, clutch elements acting in conjunction with said races in the annular space therebetween, and means to force lubricate said space, comprising an integral formation on a rotating one of said races which has a face exposed in the direction or rotation of said race, said formation being provided with a lubricant scoop passage therein opening from said face and extending in the formation generally tangentially of the rotative direction, said rotating race having a further, generally axial passage therein communicating with said first named passage and extending to said annular space, said first named passage being inclined in the axial direction toward said space, said passages being formed wholly within said rotating race, and an annular retainer for said clutch elements disposed at an axial end of the latter remote from said formation and apertured for the passage of lubricant supplied to said annular space by said force lubricating means.

6. A force lubricated rotary member having an integral formation thereon to rotate therewith, said formation having a face exposed toward the direction of rotation thereof, said formation being provided with a lubricant scoop passage therein to receive lubricant from a supply during rotation of said member and discharge the lubricant in a pressurized flow, said passage opening from said face and extending in the formation generally tangentially of the rotative direction to an axial side face of said member spaced axially from said formation, at which side face said lubricant flow is discharged, said passage being inclined in the axial direction toward said side face.

7. A force lubricated rotary member having an integral formation thereon to rotate therewith, said formation having a face exposed toward the direction of rotation thereof, said formation being provided with a lubricant scoop passage therein to receive lubricant from a supply during rotation of said member and discharge the lubricant in a pressurized flow, said passage opening from said face and extending in the formation generally tangentially of the rotative direction, said member having a further, generally axial passage therein communicating with said first named passage and extending to an axial side face of said member spaced axially from said formation, at which side face said lubricant flow is discharged, said first named passage being inclined in the axial direction toward said side face.

8. A force lubricated rotary member having an integral formation thereon to rotate therewith, said formation having a face exposed toward the direction of rotation thereof, said formation being provided with a lubricant scoop passage therein to receive lubricant from a supply during rotation of said member and discharge the lubricant in a pressurized flow, said passage opening from said face and extending in the formation generally tangentially of the rotative direction, said member having a further, generally axial passage therein communicating with said first named passage and extending to an axial side face of said member spaced axially from said formation, at which side face said lubricant flow is discharged, said first named passage being inclined in the axial direction toward said side face, said passages being formed wholly within said member.

9. A force lubricated rotary clutch mechanism including a pair of coaxial, radially spaced and relatively rotatable races, clutch elements acting in conjunction with said races in the annular space therebetween, and means to force lubricate said space, comprising an integral formation on a rotating one of said races which has a face exposed in the direction of rotation of said race, said formation being provided with a lubricant scoop passage therein opening from said face and extending inwardly in the formation from said face in a direction inclined somewhat radially inwardly in relation to a tangent of the rotary path of the formation, said passage also being inclined in the axial direction toward said space, said passage being formed wholly within said rotating race.

References Cited by the Examiner

UNITED STATES PATENTS

| | | | |
|---|---|---|---|
| 938,191 | 10/1909 | Whiting | 103—85 |
| 1,856,189 | 5/1932 | Johnson et al. | 192—113 |
| 1,850,340 | 3/1932 | Cowles | 192—113 |
| 1,960,512 | 5/1934 | Roos et al. | 192—113 |
| 2,463,890 | 3/1949 | Lundquist | 308—127 |
| 2,651,553 | 9/1953 | Simonis et al. | 308—127 |
| 2,938,612 | 5/1960 | Schindel | 192—41 |
| 3,037,600 | 6/1962 | Hechethron | 192—45.1 |

FOREIGN PATENTS 1,294,297  4/1962  France.

DAVID J. WILLIAMOWSKY, *Primary Examiner.*